United States Patent [19]
Suzuki et al.

[11] Patent Number: 5,904,908
[45] Date of Patent: May 18, 1999

[54] METHOD FOR THE REMOVAL OF CARBON DIOXIDE PRESENT IN GASES

[75] Inventors: Hitomi Suzuki, Matsuyama; Tomio Mimura, Osaka; Toru Iwaki, Hiroshima; Shigeaki Mitsuoka; Hiroshi Tanaka, both of Hiroshima; Masaki Iijima, Tokyo, all of Japan

[73] Assignees: Mitsubishi Heavy Industries, Ltd., Tokyo; The Kansai Electric Power Co., Inc., Osaka, both of Japan

[21] Appl. No.: 08/816,646

[22] Filed: Mar. 13, 1997

[30] Foreign Application Priority Data

Mar. 19, 1996 [JP] Japan .................. 8-062635

[51] Int. Cl.⁶ .................. B01D 53/62
[52] U.S. Cl. .................. 423/228; 423/229; 95/236
[58] Field of Search .................. 95/236, 235; 423/228, 423/229

[56] References Cited

U.S. PATENT DOCUMENTS

| | | | |
|---|---|---|---|
| 3,653,804 | 4/1972 | Wehner et al. | 423/229 |
| 4,094,957 | 6/1978 | Sartori et al. | 423/228 |
| 4,364,915 | 12/1982 | Proctor et al. | 423/228 |
| 4,892,674 | 1/1990 | Ho et al. | 252/189 |

FOREIGN PATENT DOCUMENTS

| | | | |
|---|---|---|---|
| 160203 | 10/1985 | European Pat. Off. | 95/236 |
| 1467942 | 4/1967 | France . | |
| 2534018 | 2/1977 | Germany | 95/235 |
| 19548008 | 5/1996 | Germany . | |

Primary Examiner—Michael Lewis
Assistant Examiner—Peter DiMauro
Attorney, Agent, or Firm—Foley & Lardner

[57] ABSTRACT

This invention provides a method for the removal of carbon dioxide present in gases which comprises bringing a $CO_2$-containing gas into contact with an aqueous solution containing at least one amine compound of the general formula [1]

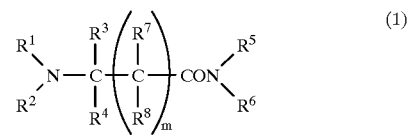

wherein $R^1$ to $R^8$ may be the same or different and each represent a hydrogen atom or an alkyl group of 1 to 4 carbon atoms, and m is 0 or 1. The method of the present invention makes it possible to remove carbon dioxide efficiently. In particular, since carbon dioxide can be easily desorbed by heating the aqueous solution having absorbed carbon dioxide, the thermal energy required for regeneration of the aqueous solution can be reduced.

14 Claims, 2 Drawing Sheets

METHOD FOR THE REMOVAL OF CARBON DIOXIDE PRESENT IN GASES

FIELD OF THE INVENTION AND RELATED ART STATEMENT

This invention relates to a method for the removal of $CO_2$ (carbon dioxide) present in $CO_2$-containing gases such as combustion exhaust gas. More particularly, it relates to a method for the efficient removal of $CO_2$ present in gases by using an aqueous solution containing a specific amine compound.

Conventionally, investigations have been made on the recovery and removal of acid gases (in particular, $CO_2$) contained in gases (i.e., gases to be treated) such as natural gas, various industrial gases (e.g., synthesis gas) produced in chemical plants, and combustion exhaust gas, and a variety of methods therefor have been proposed. In the case of combustion exhaust gas taken as an example, the method of removing and recovering $CO_2$ present in combustion exhaust gas by bringing the combustion exhaust gas into contact with an aqueous solution of an alkanolamine or the like, and the method of storing the recovered $CO_2$ without discharging it into the atmosphere are being vigorously investigated.

Although useful alkanolamines include monoethanolamine, diethanolamine, triethanolamine, methyldiethanolamine, diisopropanolamine, diglycolamine and the like, it is usually preferable to use monoethanolamine (MEA).

However, the use of an aqueous solution of such an alkanolamine, typified by MEA, as an absorbent for absorbing and removing $CO_2$ present in combustion exhaust gas is not always satisfactory in consideration of the amount of $CO_2$ absorbed for a given amount of an aqueous amine solution having a given concentration, the amount of $CO_2$ absorbed per mole of the amine in an aqueous amine solution having a given concentration, the rate of $CO_2$ absorption at a given concentration, and the thermal energy required for regeneration of the aqueous alkanolamine solution having absorbed $CO_2$.

Now, many techniques for separating acid gases from various mixed gases by use of an amine compound are known, and examples thereof are given below.

In Japanese Patent Laid-Open No. 100180/'78, there is described a method for the removal of acid gases wherein a normally gaseous mixture is brought into contact with an amine-solvent liquid absorbent composed of (1) an amine mixture comprising at least 50 mole % of a hindered amine having at least one secondary amino group forming a part of the ring and attached to a secondary or tertiary carbon atom, or a primary amino group attached to a tertiary carbon atom, and at least about 10 mole % of a tertiary amino-alcohol, and (2) a solvent for the aforesaid amine mixture which serves as a physical absorbent for acid gases. It is stated therein that useful hindered amines include 2-piperidine-ethanol [i.e., 2-(2-hydroxyethyl)piperidine], 3-amino-3-methyl-1-butanol and the like, and useful solvents include sulfoxide compounds which may contain up to 25% by weight of water. As an example of the gas to be treated, a normally gaseous mixture containing high concentrations of carbon dioxide and hydrogen sulfide (e.g., 35% $CO_2$ and 10–12% $H_2S$) is described therein. Moreover, $CO_2$ itself is used in some examples of this patent.

In Japanese Patent Laid-Open No. 71819/'86, an acid gas scrubbing composition comprising a hindered amine and a nonaqueous solvent such as sulfolane is described. In this patent, the usefulness of hindered amines for the absorption of $CO_2$ is explained with the aid of reaction formulas.

The carbon dioxide absorption behavior of an aqueous solution containing 2-amino-2-methyl-1-propanol (AMP) as a hindered amine is disclosed in Chemical Engineering Science, Vol. 41, No. 4, pp. 997–1003. $CO_2$ and a $CO_2$-nitrogen mixture at atmospheric pressure are used as gases to be treated.

The rates of $CO_2$ and $H_2S$ absorption by an aqueous solution of a hindered amine (such as AMP) and an aqueous solution of a straight-chain amine (such as MEA) in the vicinity of ordinary temperature are reported in Chemical Engineering Science, Vol. 41, No. 2, pp. 405–408.

U.S. Pat. No. 3,622,267 discloses a technique for purifying synthesis gas obtained by partial oxidation of crude oil or the like and having a high partial pressure of $CO_2$ (e.g., synthesis gas containing 30% $CO_2$ at 40 atmospheres) by use of an aqueous mixture containing methyldiethanolamine and monoethylmonoethanolamine.

Deutsche Offenlegungschrift Nr. 1,542,415 discloses a technique for enhancing the rate of $CO_2$, $H_2S$ and COS absorption by the addition of a monoalkylalkanolamine or the like to physical or chemical absorbents. Similarly, Deutsche Offenlegungschrift Nr. 1,904,428 discloses a technique for enhancing the absorption rate of methyldiethanolamine by the addition of monomethylethanolamine.

U.S. Pat. No. 4,336,233 discloses a technique for the purification of natural gas, synthesis gas and gasified coal by use of a washing fluid comprising an aqueous solution containing piperazine at a concentration of 0.81–1.3 moles per liter or an aqueous solution containing piperazine in combination with a solvent such as methyldiethanolamine, triethanolamine, diethanolamine or monomethylethanolamine.

Similarly, Japanese Patent Laid-Open No. 63171/'77 discloses a $CO_2$ absorbent comprising a tertiary alkanolamine, monoalkylalkanolamine or the like to which piperazine or a piperazine derivative such as hydroxyethylpiperazine is added as a promoter.

As described above, an efficient method for the removal of $CO_2$ from various $CO_2$-containing gases is desired. In particular, it is a pressing important problem to choose a $CO_2$ absorbent (amine compound) which, when a gas is treated with an aqueous solution containing the absorbent at a given concentration, can give a large amount of $CO_2$ absorbed per mole of the-absorbent, a large amount of $CO_2$ absorbed per unit volume of the aqueous solution, and a high absorption rate. Moreover, it is desirable that the absorbent requires less thermal energy in separating the absorbed $CO_2$ to regenerate the absorbing solution. It may be difficult to meet all of these requirements by using a single amine compound. However, if an amine compound meeting some requirements is found, it may be possible to meet a more desirable combination of requirements, for example, by mixing it with one or more other amine compounds. That is, if an amine compound capable of giving, for example, a large amount of $CO_2$ absorbed per mole of the absorbent, it may be possible to improve its absorption rate and other properties separately.

In view of the above-described existing state of the prior art, it is an object of the present invention to provide an efficient method for the removal of $CO_2$ from $CO_2$-containing gases by using a novel amine compound which can give a large amount of $CO_2$ absorbed per mole of the absorbent and has the property of liberating the absorbed $CO_2$ easily.

SUMMARY OF THE INVENTION

In order to solve the above-described problems, the present inventors made intensive investigations on absorbents used to remove $CO_2$ present in combustion exhaust gas and have now discovered that an aqueous solution of a specific amine compound has great $CO_2$-absorbing power and permits the absorbed $CO_2$ to be easily liberated. The present invention has been completed on the basis of this discovery. That is, the present invention has the following two aspects.

According to a first aspect of the present invention, there is provided a method for the removal of $CO_2$ present in gases which comprises bringing a $CO_2$-containing gas into contact with an aqueous solution containing at least one amine compound of the general formula [1]

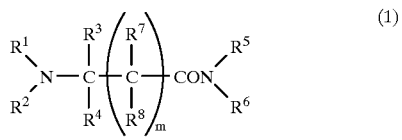

wherein $R^1$ to $R^8$ may be the same or different and each represent a hydrogen atom or an alkyl group of 1 to 4 carbon atoms, and m is 0 or 1.

According to a second aspect of the present invention, there is provided a method for the removal of $CO_2$ present in gases which comprises bringing a $CO_2$-containing gas into contact with an aqueous solution containing at least one amine compound of the above general formula [1] and at least one other amine compound having great $CO_2$-absorbing power.

When an aqueous solution containing an amine compound of the general formula [1] is used as an absorbing solution according to the method of the present invention, the amount of $CO_2$ liberated per mole of the absorbent is increased as compared with the case where a conventional absorbing solution is used. Thus, $CO_2$ can be removed more efficiently.

Moreover, since the amine compound of the general formula [1] permits the absorbed $CO_2$ to be easily desorbed by heating the absorbing solution having absorbed $CO_2$, less thermal energy is required to regenerate the absorbing solution. Thus, a process having a smaller overall energy consumption for the recovery of $CO_2$ can be constructed.

DETAILED DESCRIPTION OF PREFERRED EMBODIMENTS

Figure 1:
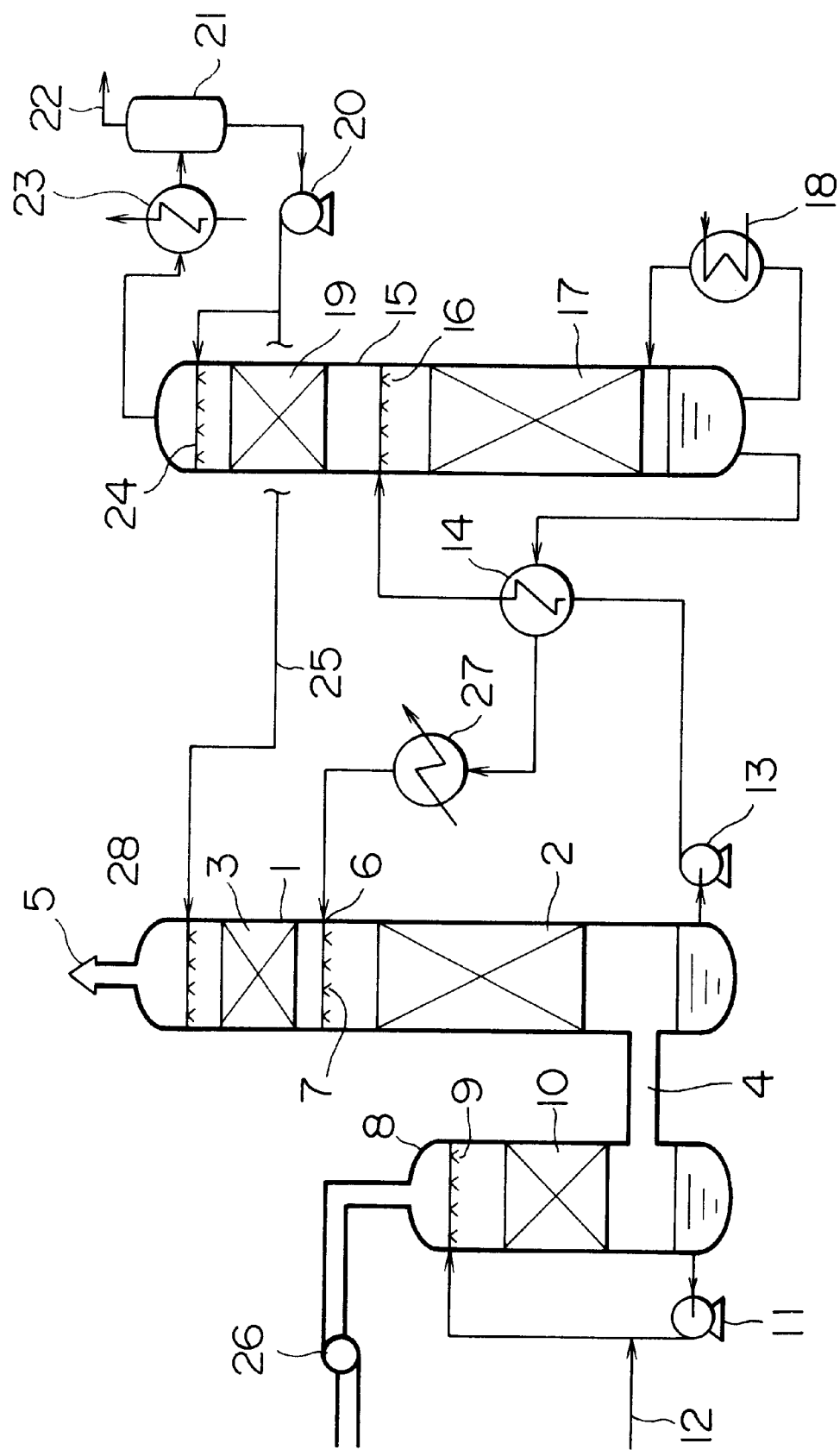
FIG. 1 is a flow diagram illustrating an exemplary process for the removal of $CO_2$ present in combustion exhaust gas to which the method of the present invention can be applied.

In the amine compounds of the general formula [1] which can be used in the present invention, $R^1$ to $R^8$ may be the same or different and each represent a hydrogen atom or an alkyl group of 1 to 4 carbon atoms. Specific examples of the alkyl group of 1 to 4 carbon atoms include methyl, ethyl, propyl, isopropyl, butyl, isobutyl, sec-butyl and tert-butyl groups. Among others, it is preferable to use a combination of alkyl groups in which the sum of the numbers of carbon atoms of $R^1$ and $R^2$ and the sum of the numbers of carbon atoms of $R^5$ and $R^6$ are 4 or less and the sum of the numbers of carbon atoms of $R^3$ and $R^4$ and the sum of the numbers of carbon atoms of $R^7$ and $R^8$ are 2 or less. Amine compounds of the general formula [1] may be used alone or in admixture of two or more.

Specific examples of amine compounds of the general formula [1] include 2-aminopropionamide [$H_2NCH(CH_3)CONH_2$], 2-amino-2-methylpropionamide [$H_2NC(CH_3)_2CONH_2$], 3-amino-3-methylbutylamide [$H_2NC(CH_3)_2CH_2CONH_2$], 2-amino-2-methyl-N-methylpropionamide [$H_2NC(CH_3)_2CONH(CH_3)$], 3-amino-3-methyl-N-methylbutylamide [$H_2NC(CH_3)_2CH_2CONH(CH_3)$], 3-amino-3-methyl-N,N-dimethylbutylamide [$H_2NC(CH_3)_2CH_2CON(CH_3)_2$], 2-ethylaminoacetamide [$(H_5C_2)NHCH_2CONH_2$], 2-(t-butylamino)acetamide [$(tert-H_9C_4)NHCH_2CONH_2$], 2-dimethylamino-N,N-dimethylacetamide [$(CH_3)_2NCH_2CON(CH_3)_2$], 2-ethylamino-2-methylpropionamide [$(H_5C_2)NHC(CH_3)_2CONH_2$], 3-ethylaminopropionamide [$(H_5C_2)NHCH_2CH_2CONH_2$], 3-ethylaminobutylamide [$(H_5C_2)NHCH(CH_3)CH_2CONH_2$], 3-ethylamino-3-methylbutylamide [$(H_5C_2)NHC(CH_3)_2CH_2CONH_2$], 2-diethylaminoacetamide [$(H_5C_2)_2NCH_2CONH_2$], 2-diethylaminopropionamide [$(H_5C_2)_2NCH(CH_3)CONH_2$], 2-diethylamino-2-methylpropionamide [$(HC_2)_2NC(CH_3)_2CONH_2$] and 3-diethylamino-3-methylbutylamide [$(H_5C_2)_2NC(CH_3)_2CH_2CONH_2$].

In the aqueous solution containing at least one amine compound as described above (hereinafter also referred to as the absorbing solution), which is used for contact with a $CO_2$-containing gas according to the present invention, the concentration of the amine compound is usually in the range of 15 to 65% by weight and preferably 30 to 50% by weight. The temperature at which the absorbing solution is brought into contact with a $CO_2$-containing gas is usually in the range of 30 to 70° C.

If necessary, the absorbing solution used in the present invention may further contain corrosion inhibitors, deterioration inhibitors and the like.

Moreover, in order to enhance the $CO_2$-absorbing power (e.g., the amount of $CO_2$ absorbed and the absorption rate) of the absorbing solution, one or more other amine compounds having great $CO_2$-absorbing power may be used in addition to the amine compound of the above general formula [1]. Preferred examples of the other amine compounds used for this purpose include monoethanolamine, 2-methylaminoethanol, 2-ethylaminoethanol, 2-isopropylaminoethanol, 2-n-butylaminoethanol, piperazine, 2-methylpiperazine, 2,5-dimethylpiperazine, piperidine and 2-piperidine-ethanol. Where these other amine compounds are used, they are usually used at a concentration of 1.5 to 50% by weight and preferably 5 to 40% by weight, provided that they are soluble in water together with the amine compound of the general formula [1].

The gases which can be treated in the present invention include natural gas, various industrial gases (e.g., synthesis gas) produced in chemical plants, combustion exhaust gas and the like. Among others, the method of the present invention can be applied to gases under atmospheric pressure and, in particular, combustion exhaust gas under atmospheric pressure. As used herein, the term "atmospheric pressure" comprehends a deviation from atmospheric pressure which may be caused by using a blower or the like to feed combustion exhaust gas.

The present invention is more specifically explained below in connection with an illustrative case in which the gas to be treated comprises combustion exhaust gas. Although no particular limitation is placed on the process employed in the removal of $CO_2$ present in combustion exhaust gas according to the method of the present invention, one example thereof is described with reference to FIG. 1. In FIG. 1, only essential equipment is illustrated and incidental equipment is omitted.

The equipment illustrated in FIG. 1 includes a decarbonation tower 1, a lower packed region 2, an upper packed region or trays 3, a combustion exhaust gas inlet port 4 to the decarbonation tower, a decarbonated combustion exhaust gas outlet port 5, an absorbing solution inlet port 6, a nozzle-7, an optionally installed combustion exhaust gas cooler 8, a nozzle 9, a packed region 10, a humidifying and cooling water circulating pump 11, a make-up water supply line 12, a $CO_2$-loaded absorbing solution withdrawing pump 13, a heat exchanger 14, an absorbing solution regeneration tower (hereinafter abbreviated as "regeneration tower") 15, a nozzle 16, a lower packed region 17, a regenerative heater (or reboiler) 18, an upper packed region 19, a reflux water pump 20, a $CO_2$ separator 21, a recovered $CO_2$ discharge line 22, a regeneration tower reflux condenser 23, a nozzle 24, a regeneration tower reflux water supply line 25, a combustion 20 exhaust gas feed blower 26, a cooler 27 and a regeneration tower reflux water inlet port 28.

In FIG. 1, combustion exhaust gas is forced into combustion exhaust gas cooler 8 by means of combustion exhaust gas feed blower 26, humidified and cooled in packed region 10 by contact with humidifying and cooling water from nozzle 9, and then conducted to decarbonation tower 1 through combustion exhaust gas inlet port 4. The humidifying and cooling water which has come into contact with the combustion exhaust gas is collected in the lower part of combustion exhaust gas cooler 8 and recycled to nozzle 9 by means of pump 11. Since the humidifying and cooling water is gradually lost by humidifying and cooling the combustion exhaust gas, make-up water is supplied through make-up water supply line 12.

In the lower packed region 2 of decarbonation tower 1, the combustion exhaust gas forced thereinto is brought into counterflow contact with an absorbing solution having a predetermined concentration and sprayed from nozzle 7. Thus, $CO_2$ present in the combustion exhaust gas is removed by absorption into the absorbing solution supplied through absorbing solution inlet port 6. The decarbonated combustion exhaust gas passes into upper packed region 3. The absorbing solution supplied to decarbonation tower 1 absorbs $CO_2$ and the resulting heat of reaction usually makes the absorbing solution hotter than its temperature at absorbing solution inlet port 6. The absorbing solution which has absorbed $CO_2$ is withdrawn by $CO_2$-loaded absorbing solution withdrawing pump 13, heated in heat exchanger 14, and then introduced into absorbing solution regeneration tower 15. The temperature of the regenerated absorbing solution can be regulated by heat exchanger 14 or cooler 27 which is optionally installed between heat exchanger 14 and absorbing solution inlet port 6.

In absorbing solution regeneration tower 15, the absorbing solution is regenerated through heating by regenerative heater 18. The regenerated absorbing solution is cooled by heat exchanger 14 and optionally installed cooler 27, and returned to the absorbing solution inlet port 6 of decarbonation tower 1. In the upper part of absorbing solution regeneration tower 15, $CO_2$ separated from the absorbing solution is brought into contact with reflux water sprayed from nozzle 24, cooled by regeneration tower reflux condenser 23, and introduced into $CO_2$ separator 21 where $CO_2$ is separated from reflux water obtained by condensation of water vapor entrained thereby and then conducted to a $CO_2$ recovery process through recovered $CO_2$ discharge line 22. Part of the reflux water is recycled to absorbing solution regeneration tower 15 through nozzle 24 by means of reflux water pump 20, while the remainder is supplied to the upper part of decarbonation tower 1 through regeneration tower reflux water supply line 25.

The present invention is further illustrated by the following examples.

EXAMPLE 1

A glass reactor placed in a thermostatic chamber was charged with 50 milliliters of a 1 mole/liter (13 wt. %) aqueous solution of diethylaminoacetamide [DEAAA; $(H_5C_2)_2NCH_2CONH_2$] as an absorbing solution. While this absorbing solution was being stirred at a temperature of 40° C., $CO_2$ gas was passed therethrough under atmospheric pressure at a flow rate of 1 liter per minute for 1 hour. During this test, $CO_2$ gas was supplied through a filter so as to facilitate bubble formation.

After 1 hour, the amount of $CO_2$ contained in the absorbing solution was measured with a $CO_2$ analyzer (or total organic carbon analyzer), and the degree of $CO_2$ absorption (i.e., the molar ratio of $CO_2$ to the absorbing solution) was determined. Next, the reactor holding the absorbing solution was heated at 100° C. to examine the ease of desorption of $CO_2$ from the absorbing solution at 100° C. To this end, small amounts of samples of the absorbing solution heated at 100° C. were taken with the lapse of time and their $CO_2$ contents were measured with a $CO_2$ analyzer.

COMPARATIVE EXAMPLE 1

An absorption/desorption test was carried out with a 1 mole/liter (12 wt. %) aqueous solution of 2-diethylaminoethanol [DEAE; $(H_5C_2)NCH_2CH_2OH$] having an analogous chemical formula. The results thus obtained are shown in Table 1 and FIG. 2.

TABLE 1

| | Component of absorbing solution | $CO_2$ content after absorption (A) [mole %] | $CO_2$ content after heating (B) [mole %] | Amount of $CO_2$ liberated (A-B) [%] |
|---|---|---|---|---|
| Example 1 | DEAAA | 62.9 | 2.3 | 60.6 |
| Comparative Example 1 | DEAE | 99.9 | 44.8 | 55.1 |

Figure 2:
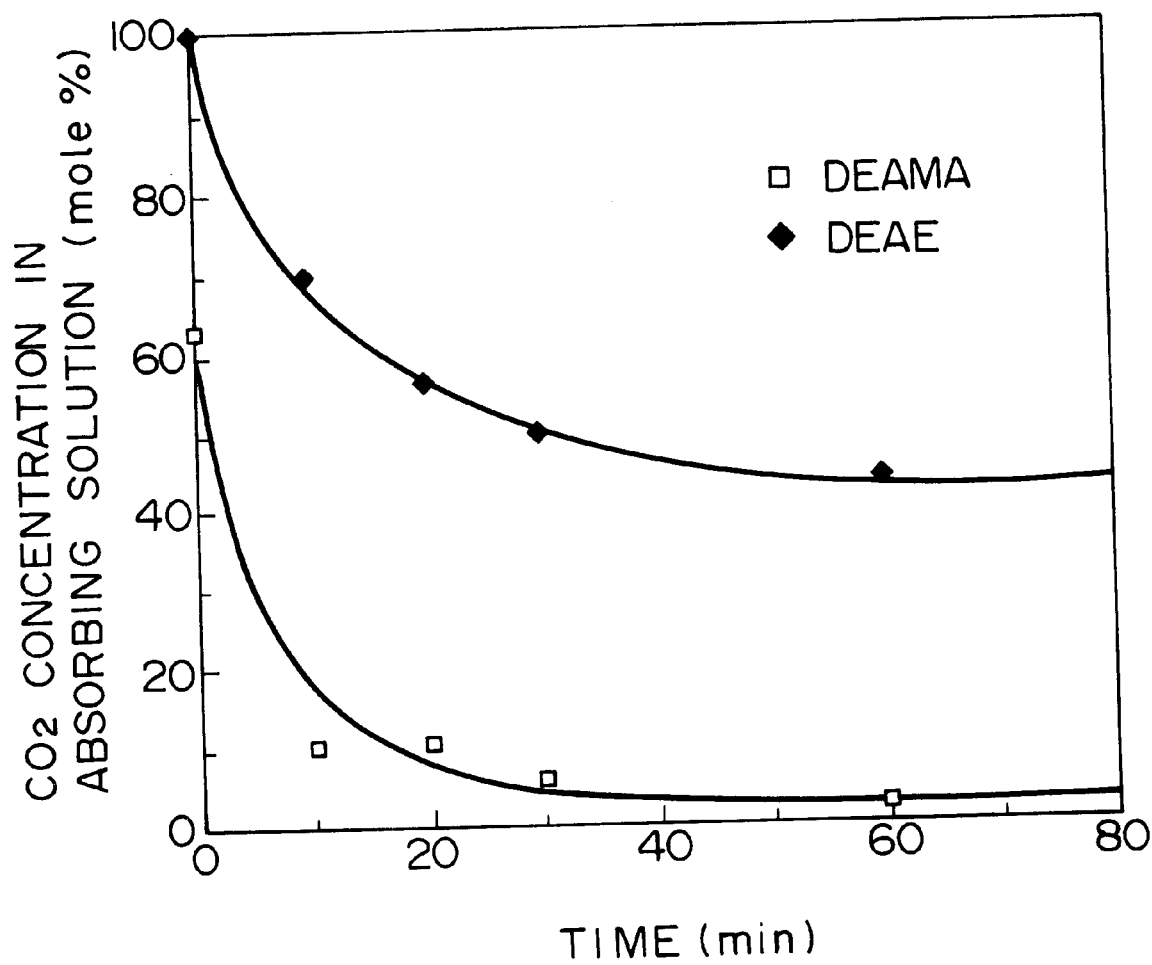
FIG. 2 is a graph showing changes with time of the $CO_2$ concentration in the absorbing solution as observed in the $CO_2$ desorption tests of Example 1 and Comparative Example 1.

It can be seen from the results shown in Table 1 and FIG. 2 that, when an aqueous solution of diethylaminoacetamide (DEAAA) that is an amine compound in accordance with the present invention is used as an absorbing solution for $CO_2$ gas, the amount of $CO_2$ absorbed per mole of the absorbent is somewhat smaller than when an aqueous solution of DEAE is used, but the amount of $CO_2$ liberated is larger than when an aqueous solution of DEAE is used because of the ease of desorption of $CO_2$ from the absorbing solution, thus making it possible to remove $CO_2$ efficiently.

EXAMPLES 2–3 AND COMPARATIVE EXAMPLE 2

Absorption/desorption tests for $CO_2$ gas were carried out in the same manner as in Example 1, except that the aqueous solution of DEAAA was replaced by a 1 mole/liter (10 wt. %) aqueous solution of 2-(t-butylamino)acetamide [t-BAAA; (tert-H$_9$C$_4$)NHCH$_2$CONH$_2$] (Example 2) or a 1 mole/liter (13 wt. %) aqueous solution of 2-dimethylamino-N,N-dimethylacetamide [DMADMAA; (CH$_3$)$_2$NCH$_2$CON(CH$_3$)$_2$] (Example 3). Moreover, an absorption/desorption test was carried out with a 1 mole/liter (9 wt. %) aqueous solution of 2-ethylaminoethanol (EAE) (Comparative Example 2). The results thus obtained are shown in Table 2.

TABLE 2

| | Component of absorbing solution | CO$_2$ content after absorption (A) [mole %] | CO$_2$ content after heating (B) [mole %] | Amount of CO$_2$ liberated (A-B) [%] |
|---|---|---|---|---|
| Example 2 | t-BAAA | 89.3 | 10.9 | 78.4 |
| Example 3 | DMADMAA | 86.2 | 8.5 | 77.7 |
| Comparative Example 2 | EAE | 92.5 | 39.1 | 53.4 |

It can be seen from the results shown in Table 2 that, when an aqueous solution of 2-(t-butylamino)acetamide (t-BAAA) or 2-dimethylamino-N,N-dimethylacetamide (DMADMAA) that is an amine compound in accordance with the present invention is used as an absorbing solution for CO$_2$ gas, the amount of CO$_2$ absorbed per mole is somewhat smaller than when an aqueous solution of EAE is used, but the amount of CO$_2$ liberated is larger than when an aqueous solution of EAE is used because of the ease of desorption of CO$_2$ from the absorbing solution, thus making it possible to remove CO$_2$ efficiently.

We claim:

1. A method for the removal of CO$_2$ present in gases which comprises bringing a CO$_2$-containing gas into contact with an aqueous solution containing at least one amine compound of the general formula [1]

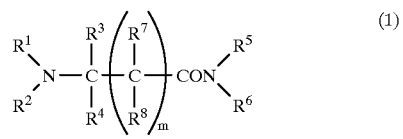

(1)

wherein R$^1$ to R$^8$ may be the same or different and each represent a hydrogen atom or an alkyl group of 1 to 4 carbon atoms, and m is 0 or 1.

2. A method for the removal of CO$_2$ present in gases as claimed in claim 1 wherein the concentration of the amine compound of the general formula [I] in the aqueous solution is in the range of 15 to 65% by weight.

3. A method for the removal of CO$_2$ present in gases as claimed in claim 1 wherein the CO$_2$-containing gas is combustion exhaust gas under atmospheric pressure.

4. A method for the removal of CO$_2$ present in gases as claimed in claim 1 wherein the amine compound of the general formula [I] comprises at least one compound selected from the group consisting of diethylaminoacetamide, 2-(t-butylamino)acetamide and 2-dimethylamino-N,N-dimethylacetamide.

5. A method for the removal of CO$_2$ present in gases as claimed in claim 1 wherein the aqueous solution additionally contains at least one other amine compound having CO$_2$-absorbing power.

6. A method for the removal of CO$_2$ present in gases as claimed in claim 5 wherein the concentration of the amine compound of the general formula [I] in the aqueous solution is in the range of 15 to 65% by weight.

7. A method for the removal of CO$_2$ present in gases as claimed in claim 5 wherein the CO$_2$-containing gas is combustion exhaust gas under atmospheric pressure.

8. A method for the removal of CO$_2$ present in gases as claimed in claim 5 wherein the amine compound of the general formula [I] comprises at least one compound selected from the group consisting of diethylaminoacetamide, 2-(t-butylamino)acetamide and 2-dimethylamino-N,N-dimethylacetamide.

9. A method according to claim 2, wherein said concentration is 30 to 50% by weight.

10. A method according to claim 1, wherein said contact occurs at a temperature between 30 and 70° C.

11. A method according to claim 1, wherein said aqueous solution further comprises a corrosion inhibitor or a deterioration inhibitor.

12. A method according to claim 1, wherein said solution further comprises a second amine compound.

13. A method according to claim 12, wherein said second amine compound is present in an amount from 1.5 to 50% by weight.

14. A method according to claim 1, wherein said gas is natural gas, industrial gas produced in a chemical plant, or a combustion exhaust gas.

* * * * *